(12) United States Patent
Choi et al.

(10) Patent No.: US 12,327,878 B2
(45) Date of Patent: *Jun. 10, 2025

(54) BATTERY MODULE

(71) Applicant: LG Energy Solution, Ltd., Seoul (KR)

(72) Inventors: Jonghwa Choi, Daejeon (KR);
Junyeob Seong, Daejeon (KR);
Myungki Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 592 days.

This patent is subject to a terminal disclaimer.

(21) Appl. No.: 17/754,455

(22) PCT Filed: Aug. 11, 2020

(86) PCT No.: PCT/KR2020/010605
§ 371 (c)(1),
(2) Date: Apr. 1, 2022

(87) PCT Pub. No.: WO2021/075690
PCT Pub. Date: Apr. 22, 2021

(65) Prior Publication Data
US 2022/0344765 A1    Oct. 27, 2022

(30) Foreign Application Priority Data
Oct. 18, 2019    (KR) .................. 10-2019-0129949

(51) Int. Cl.
*H01M 50/296*    (2021.01)
*H01M 50/211*    (2021.01)
*H01M 50/503*    (2021.01)

(52) U.S. Cl.
CPC ....... *H01M 50/296* (2021.01); *H01M 50/211* (2021.01); *H01M 50/503* (2021.01)

(58) Field of Classification Search
None
See application file for complete search history.

(56) References Cited

U.S. PATENT DOCUMENTS 12,176,496 B2 * 12/2024 Yoon .................. H01M 50/204
2010/0021802 A1   1/2010 Yang et al.
(Continued)

FOREIGN PATENT DOCUMENTS

CN    202651282 U    1/2013
CN    205264775 U    5/2016
(Continued)

OTHER PUBLICATIONS

Extended European Search Report including Written Opinion for Application No. 20876311.0 dated Oct. 13, 2022, pp. 1-8.
(Continued)

*Primary Examiner* — Kevin M Bernatz
(74) *Attorney, Agent, or Firm* — Lerner David LLP

(57) ABSTRACT

A battery module according to one embodiment of the present disclosure may include a cell block including a battery cell assembly containing one or more battery cells and a pair of terminal busbars connected to the battery cell assembly to electrically connect the battery cell to an external device, and a module frame for housing the cell block. Two or more of the cell blocks may be contained in the module frame. The two or more cell blocks may not be electrically connected to each other within the module frame.

8 Claims, 5 Drawing Sheets

(56) References Cited

U.S. PATENT DOCUMENTS

| | | | |
|---|---|---|---|
| 2010/0304203 A1 | 12/2010 | Buck et al. | |
| 2012/0231309 A1 | 9/2012 | Itoi et al. | |
| 2014/0212724 A1 | 7/2014 | Lee et al. | |
| 2015/0079443 A1 | 3/2015 | Buck et al. | |
| 2015/0236326 A1 | 8/2015 | Kim et al. | |
| 2016/0093932 A1* | 3/2016 | Obasih | H01M 10/613 429/120 |
| 2016/0133890 A1* | 5/2016 | Lee | H01M 50/503 429/151 |
| 2016/0197321 A1* | 7/2016 | Tyler | G01R 31/396 429/157 |
| 2017/0352931 A1 | 12/2017 | Yoshida et al. | |
| 2018/0194235 A1 | 7/2018 | Kim et al. | |
| 2018/0358601 A1 | 12/2018 | Yanagihara et al. | |
| 2018/0375180 A1 | 12/2018 | Buck et al. | |
| 2019/0001838 A1 | 1/2019 | Choi et al. | |
| 2019/0173064 A1 | 6/2019 | Lee et al. | |
| 2019/0280353 A1 | 9/2019 | Takahashi et al. | |
| 2019/0319225 A1 | 10/2019 | Kang | |
| 2019/0386269 A1* | 12/2019 | Taylor | H01M 10/625 |
| 2020/0168862 A1* | 5/2020 | Liu | H01M 50/204 |
| 2020/0203697 A1 | 6/2020 | Lee et al. | |
| 2022/0238950 A1* | 7/2022 | Roberts | H01M 50/516 |
| 2022/0263183 A1* | 8/2022 | Chi | H01M 50/296 |
| 2022/0359922 A1* | 11/2022 | Park | H01M 50/204 |
| 2023/0092568 A1* | 3/2023 | Park | H01M 10/48 429/159 |
| 2024/0021946 A1* | 1/2024 | Shin | H01M 50/507 |
| 2024/0322322 A1* | 9/2024 | Yang | H01M 50/284 |
| 2025/0055067 A1* | 2/2025 | Sun | H01M 10/656 |

FOREIGN PATENT DOCUMENTS

| | | | |
|---|---|---|---|
| CN | 107925028 A | 4/2018 | |
| CN | 108463902 A | 8/2018 | |
| CN | 208045567 U | 11/2018 | |
| CN | 109643780 A | 4/2019 | |
| EP | 3327821 A1 * | 5/2018 | ......... H01M 10/613 |
| EP | 3605660 A1 | 2/2020 | |
| JP | 2004214012 A | 7/2004 | |
| JP | 2012109279 A | 6/2012 | |
| JP | 2013164961 A | 8/2013 | |
| JP | 2014531730 A | 11/2014 | |
| JP | 5756530 B2 | 7/2015 | |
| JP | 2015524605 A | 8/2015 | |
| KR | 20100100859 A | 9/2010 | |
| KR | 101275347 B1 | 6/2013 | |
| KR | 20150107698 A | 9/2015 | |
| KR | 20170084699 A | 7/2017 | |
| KR | 20180135508 A | 12/2018 | |
| KR | 20190087745 A | 7/2019 | |
| KR | 20190106311 A | 9/2019 | |
| KR | 20190112583 A | 10/2019 | |
| WO | 2016113798 A1 | 7/2016 | |
| WO | 2019146962 A1 | 8/2019 | |

OTHER PUBLICATIONS

Search Report dated Dec. 18, 2023 from the Office Action for Chinese Application No. 202080072077.3 issued Jan. 16, 2024, 2 pages.

International Search Report for PCT/KR2020/010605 dated Dec. 1, 2020. 3 pgs.

Search Report dated Aug. 9, 2023 from the Office Action for Chinese Application No. 202080072077.3 issued Aug. 12, 2023, 3 pages. [See p. 1-2, categorizing the cited references].

* cited by examiner

[FIG. 1]
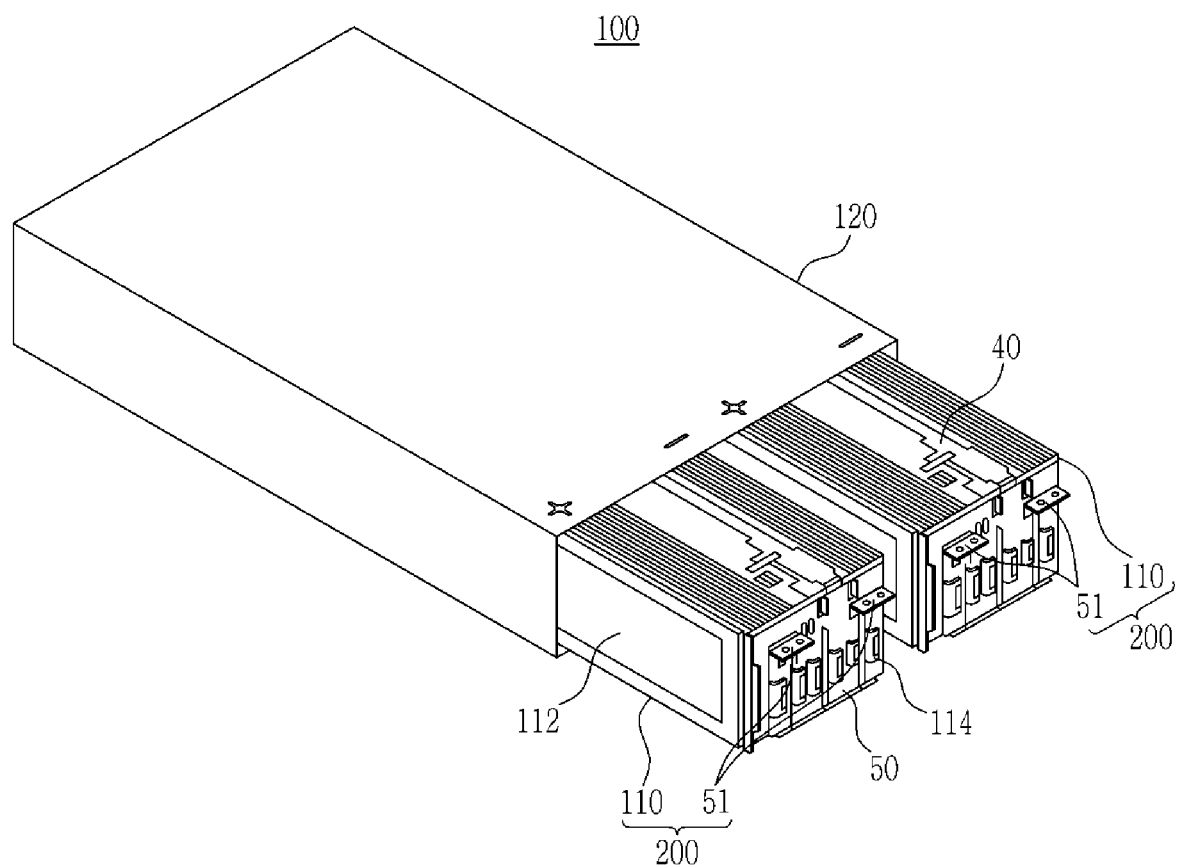

[FIG. 2]
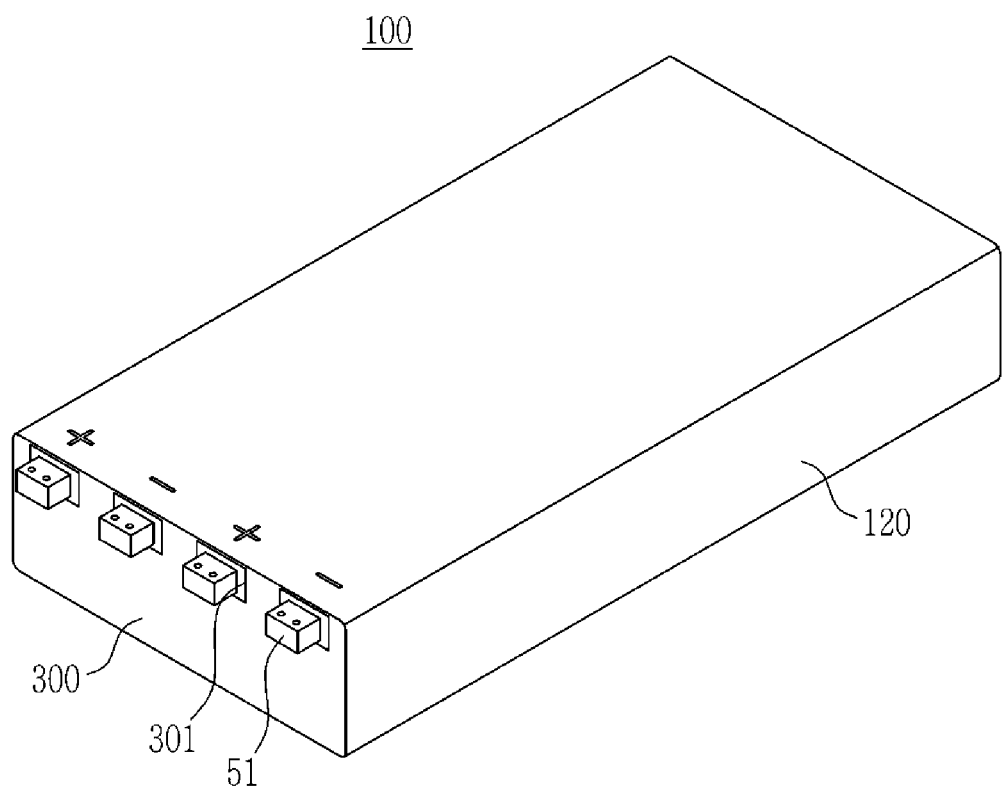

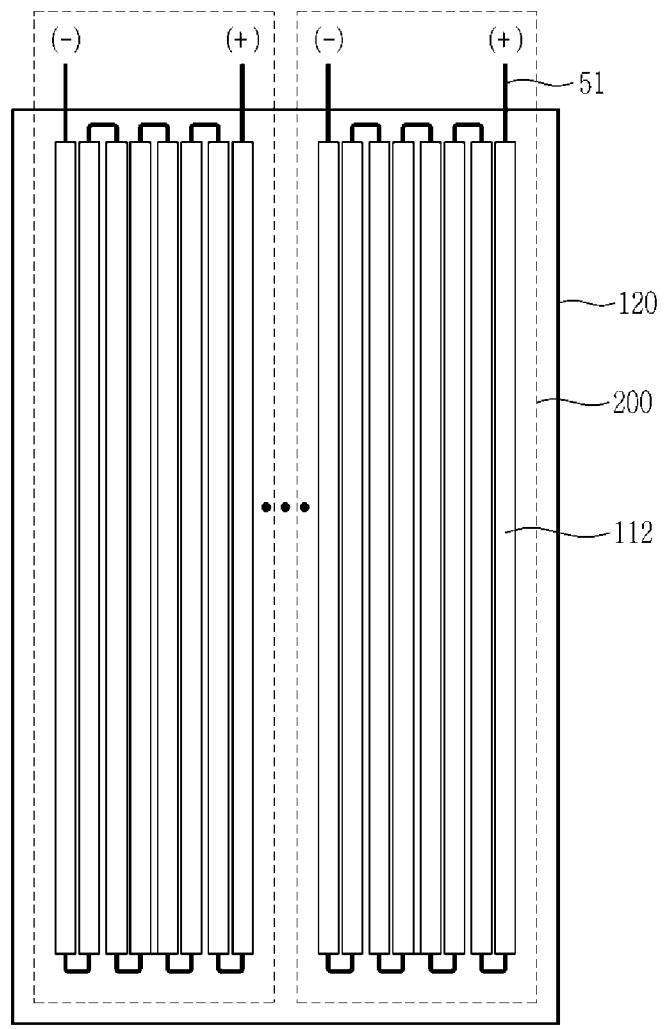
[FIG. 3]

[FIG. 4]
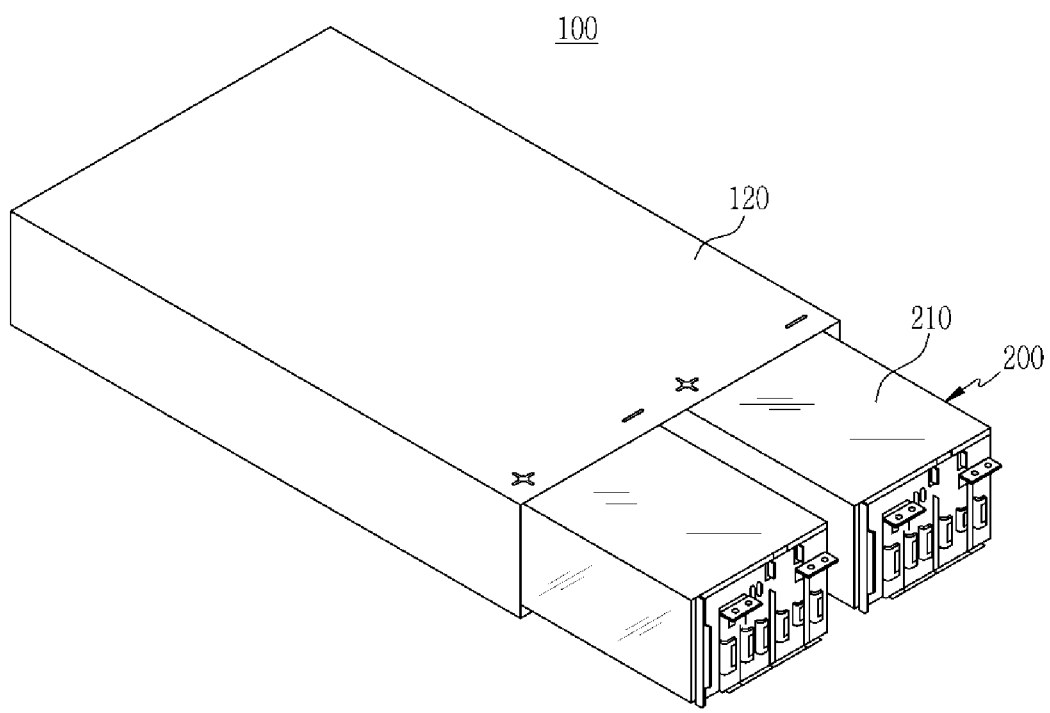

[FIG. 5]
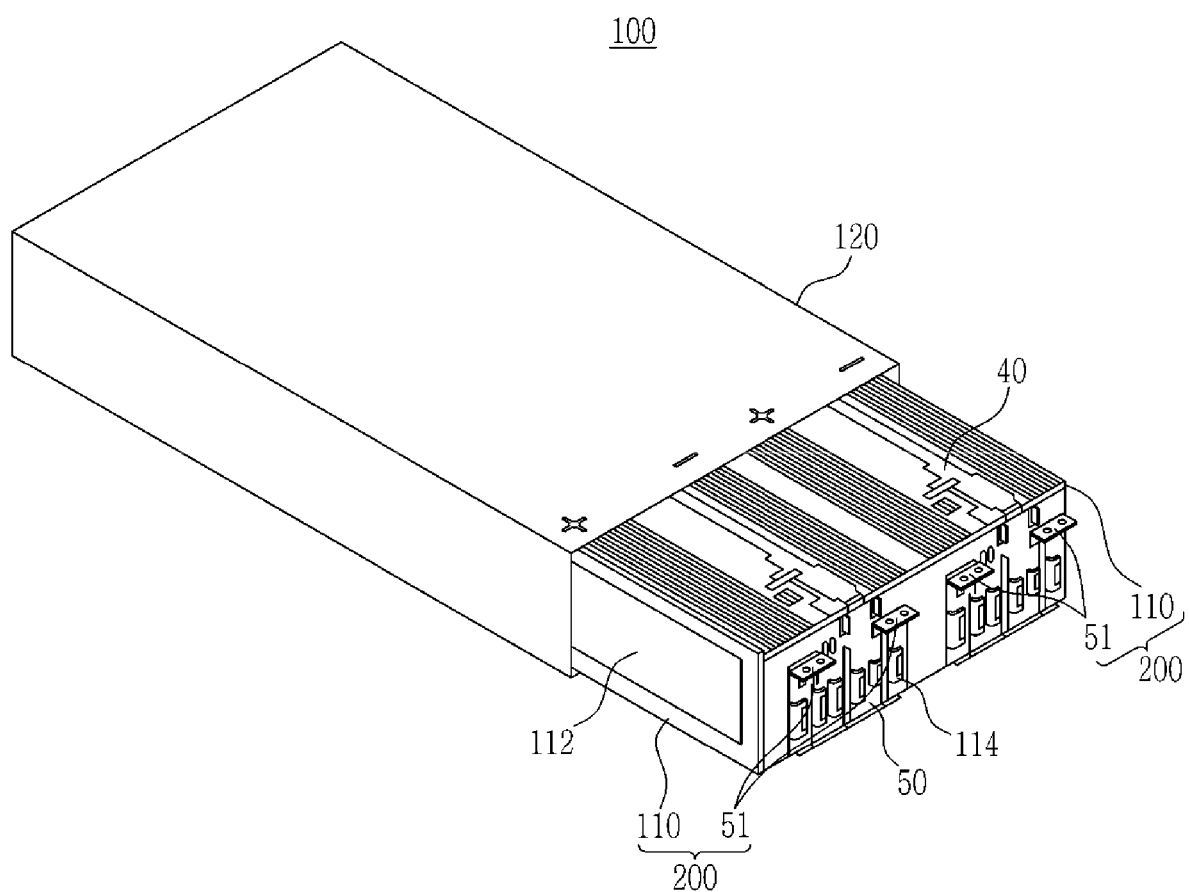

BATTERY MODULE

CROSS-REFERENCE TO RELATED APPLICATION(S)

This application is a national phase entry under 35 U.S.C. § 371 of International Application No. PCT/KR2020/010605 filed on Aug. 11, 2020, which claims the benefit of Korean Patent Application No. 10-2019-0129949 filed on Oct. 18, 2019, with the Korean Intellectual Property Office, the disclosures of which are incorporated herein by reference in their entirety.

TECHNICAL FIELD

The present disclosure relates to a battery module, and more particularly, to a battery module that is not high in voltage between terminals and thus has enhanced handling properties.

BACKGROUND ART

Since secondary batteries are easily applicable to various product groups and has electrical characteristics such as high energy density, they are universally applied not only for a portable device but also for an electric vehicle or a hybrid electric vehicle, an energy storage system or the like, which is driven by an electric driving source. Such secondary batteries are attracting attention as a new environment-friendly energy source for improving energy efficiency since it gives a primary advantage of remarkably reducing the use of fossil fuels and also does not generate by-products from the use of energy at all.

A battery pack applied to an electric vehicle and the like has a structure in which a plurality of cell assemblies including a plurality of unit cells are connected in series to obtain a high output. The unit cell can be repeatedly charged and discharged by an electrochemical reaction between components including a positive electrode current collector, a negative electrode current collector, a separator, an active material, an electrolyte solution and the like.

Meanwhile, along with an increased need for a large capacity structure including utilization as energy storage sources in recent years, there is a growing demand for a battery pack having a multi-module structure in which a plurality of battery modules, each having a plurality of secondary batteries connected in series and/or in parallel, are aggregated.

When a plurality of battery cells are connected in series/parallel to configure a battery pack, a method of configuring a battery module composed of at least one battery cell and then adding other components to at least one battery module to configure a battery pack is common. The number of battery modules included in the battery pack, or the number of battery cells included in the battery module can be variously set according to a required output voltage or charge/discharge capacity.

In particular, along with an increased demand for a large-capacity/large-area structure in recent years, the number of cells in the battery module itself is increasing, and the module voltage also increases with this increase. However, as the voltage of the electrode module is higher, it is necessary to ensure higher safety during production, handling, and transportation, and the inspection apparatus specification needs to be enhanced even on the production line, which causes a problem that the production cost increases.

DETAILED DESCRIPTION OF THE INVENTION

Technical Problem

The present disclosure has been devised to solve the above problems, and an object of the present disclosure is to provide a battery module in which the terminal voltage is not high even if the number of cells included in one battery module increases, thus capable of ensuring safety during production, handling, and transportation, and also the inspection apparatus specification on the production line can be lowered, thereby reducing the production cost.

However, the problem to be solved by embodiments of the present disclosure is not limited to the above-described problems, and can be variously expanded within the scope of the technical idea included in the present disclosure.

Technical Solution

According to one embodiment of the present disclosure, there is provided a battery module comprising: a cell block including a battery cell assembly containing one or more battery cells and a pair of terminal busbars connected to the battery cell assembly to electrically connect the battery cell to an external device; and a module frame for housing the cell block, wherein two or more of the cell blocks are contained in the module frame, and the two or more cell blocks are not electrically connected to each other within the module frame. The pair of terminal busbars may include one positive electrode terminal busbar and one negative electrode terminal busbar.

The battery module may include two or more pairs of terminal busbars.

The pair of terminal busbars, each being connected to the two or more cell blocks, may be exposed to one end part of the module frame.

The battery module may further include an end plate that is coupled to one end part of the module frame and contains four or more openings for exposing the terminal busbar.

Each of the cell blocks may include a protective film that wraps the side surface of the battery cell assembly.

The battery module may further include a busbar frame that covers an upper part of the battery cell assembly and a side surface of the battery cell assembly, and to which the terminal busbar is fixed, and the busbar frame may be provided in common to the two or more cell blocks.

Four or more terminal busbars contained in the two or more cell blocks may be fixed to the busbar frame.

According to another embodiment of the present disclosure, there can be provided a battery pack comprising the at least one battery module, and a pack case for packaging the at least one battery module.

According to yet another embodiment of the present disclosure, there can be provided a device comprising the at least one battery pack.

Advantageous Effects

According to the embodiment of the present disclosure, there can be provided a battery module in which the terminal voltage is not high even if the number of cells included in one battery module increases, thus capable of ensuring safety during production, handling, and transportation, and also the inspection apparatus specification on the production line can be lowered, thereby reducing the production cost.

BRIEF DESCRIPTION OF THE DRAWINGS

FIG. 1 is a perspective view showing an inside and an outside of a battery module according to an embodiment of the present disclosure;

FIG. 2 is a perspective view of an appearance of the battery module of FIG. 1;

FIG. 3 is a schematic view showing the battery module of FIG. 1;

FIG. 4 is a perspective view showing a battery module according to another embodiment of the present disclosure; and FIG. 5 is a perspective view showing a battery module according to yet another embodiment of the present disclosure.

DETAILED DESCRIPTION OF THE EMBODIMENTS

Hereinafter, various embodiments of the present disclosure will be described in detail with reference to the accompanying drawings so that those skilled in the art can easily carry out them. The embodiments of the present disclosure may be modified in various different ways, and is not limited to the embodiments set forth herein.

A description of parts not related to the description will be omitted herein for clarity, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a part is referred to as "including" a certain component, it means that it can further include other components, without excluding the other components, unless otherwise stated.

FIG. 1 is a diagram showing the inside and outside of a battery module according to an embodiment of the present disclosure, FIG. 2 is a diagram showing an appearance of the battery module of FIG. 1, and FIG. 3 is a diagram schematically showing the battery module of FIG. 1.

Referring FIGS. 1 to 3, the battery module 100 according to this embodiment includes a battery cell assembly 110 in which a plurality of battery cells 112 are aligned side by side and stacked adjacent to each other, and a module frame 120 that houses the battery cell assembly and forms the appearance of the battery module 100. At this time, a pair of terminal busbars 51 for electrically connecting the battery cell 112 to an external device are connected to the battery cell assembly 110, and the battery cell assembly 110 and a pair of terminal busbars 51 constitute one cell block 200. The battery module 100 according to this embodiment includes a plurality of cell blocks 200 housed in one module frame 120, wherein the plurality of cell blocks 200 are not electrically connected to each other in the battery module 100.

The battery cell assembly 110 is an assembly of secondary batteries including a plurality of battery cells 112. The battery cell assembly 110 may include a plurality of battery cells 112, and each battery cell includes an electrode lead 114. The battery cell 112 may be a pouch-type battery cell having a plate shape, but is not limited thereto. The electrode lead 114 is a positive electrode lead or a negative electrode lead, and the end part of the electrode lead 114 of each battery cell 112 may be bent in one direction, and thereby may come into contact with an end part of an electrode lead of another adjacent battery cell 112. The two electrode leads 114 that are in contact with each other may be mutually fixed by welding or the like, whereby an electrical connection can be made between the battery cells 112 in the battery cell assembly 110.

The plurality of battery cells 112 are vertically stacked so that the electrode leads 114 are aligned in one direction to form the battery cell assembly 110. The electrode leads 114 aligned in one direction are electrically connected to the terminal busbar 51 that is fixed to the busbar frame 50 coupling to the battery cell assembly 110. The terminal busbar 51 may be fixed toward the outside of the busbar frame 50, and the electrode leads 114 of the battery cell assembly 110 may pass through a slit formed in the busbar frame 50 to be electrically connected to the terminal busbar 51. Here, the busbar frame 50 is formed of an insulating material, for example, a non-conductive synthetic resin, and the terminal busbar 51 may be formed of a conductive metal material.

Further, the battery module 100 includes a flexible printed circuit board (FPCB) 40 that is extendedly mounted in the longitudinal direction of the battery cell assembly 110 at the upper part of the battery cell assembly 110 and is configured so as to sense the battery cell 112. In addition, the battery module 100 may include various electronic components. As an example, it may include an ICB (Internal Circuit Board) and a BMS (Battery Management System). Electrical components such as the ICB and BMS board may be electrically connected to the plurality of battery cells 112.

The battery cell assembly 110 and the terminal busbar 51 electrically connected thereto form one cell block 200. One cell block 200 includes a pair of terminal busbars 51, and the pair of terminal busbars 51 includes a positive electrode terminal busbar and a negative electrode terminal busbar, respectively.

The module frame 120 for housing the cell block 200 may be a mono frame having a rectangular tube shape as shown in FIG. 1 and the like. Alternatively, it may be a shape in which the upper plate is coupled to the U-shaped lower frame, but is not particularly limited.

In one embodiment of the present disclosure, a plurality of cell blocks 200 are provided and included in one module frame 120 to form the battery module 100. Therefore, the battery module 100 includes the terminal busbars 51 that needs to correspond to the number of the cell blocks 200. For example, when two cell blocks 200 are housed in the module frame 120 as shown in FIGS. 1 to 3, two pairs of terminal busbars 51 are included.

At this time, the terminal busbars 51 included in each cell block 200 are not connected to each other and the terminal busbars 51 included in other cell blocks 200, but the electrical connection can be made only in the cell block 200. Due to such a configuration, even if the number of battery cells 112 included in one battery module 100 increases and the total capacity of the battery module 100 increases, the terminal voltage does not increase at the same time, and thereby, safety can be ensured during the production, handling, and transportation of the battery module 100. Since the terminal voltage is not increased, the inspection apparatus specification on the production line can also be lowered, thereby reducing the production cost.

FIGS. 1 and 2 illustrate that two cell blocks 200 are included, but the present disclosure is not limited thereto. More than two cell blocks 200 may be included as shown in FIG. 3, which are not particularly limited. In particular, even if more than two cell blocks 200 are provided, the terminal voltage does not increase. Therefore, the capacity of the battery module 100 can be increased without being bound by safety issues in the production, handling, and transportation processes and inspection apparatus specifications.

Meanwhile, the battery module 100 according to an embodiment of the present disclosure includes an end plate 300 coupled to one end part of the module frame 120. In this case, the end plate 300 includes at least four openings 301 capable of exposing the terminal busbars 51 included in each cell block 200 to the outside. For example, when two cell blocks 200 are included in the module frame 120, a total of four terminal busbars 51 are formed and thus, four openings 301 for exposing each of them to the outside can be formed.

In this way, each of the battery cell stacked body 110 and the terminal busbar 51 are independently provided in one battery module 100, and two or more cell blocks 200 that are not electrically connected to each other are included in the battery module 100, whereby even while increasing the capacity of the battery module 100, the terminal voltage can be lowered, thus securing safety and reducing production costs.

FIG. 4 is a diagram showing a battery module according to another embodiment of the present disclosure.

In another embodiment of the present disclosure, a protective film 210 that wraps the side surface of the battery cell stack 110 included in each cell block 200 may be further included. The protective film 210 may be formed of a resin material. By providing the protective film 210, it is possible to prevent the battery cell stack 110 from being damaged in the process of housing the cell block 200 in the module frame 120 or the like. In addition, respective battery cells 112 can be maintained more stably within the battery cell stack 110.

FIG. 5 is a diagram showing a battery module according to yet another embodiment of the present disclosure.

In yet another embodiment of the present disclosure, one busbar frame 50 is provided in common to two or more cell blocks 200. For example, as shown in FIG. 5, one busbar frame 50 may be provided for two cell blocks 200. This is structured such that one busbar frame 50 covers the upper surface and side surfaces of the two battery cell stacks 110 provided in the two cell blocks 200. According to this configuration, a total of four terminal busbars 51 connected to each of the battery cell stack 110 can be fixed onto the side cover of one busbar frame 50 covering the battery cell stack 110. Thereby, even if the plurality of battery cell stacked bodies 110 are provided, it is connected to one busbar frame 50, and thus, the assembly process can be further simplified.

Meanwhile, one or more of the battery modules 100 according to an embodiment of the present disclosure can be packaged in a pack case to form a battery pack. At this time, respective terminal busbars 51 formed in the plurality of cell blocks 200 included in the battery module 100 may be electrically connected to each other in the process of packaging and assembling the battery pack. That is, an electrical connection between the cell blocks 200 can be made outside the battery module 100.

The above-mentioned battery module and the pack including the same can be applied to various devices. Such a device may be applied to a vehicle means such as an electric bicycle, an electric vehicle, or a hybrid vehicle, but the present disclosure is not limited thereto, and is applicable to various devices that can use a battery module, which also falls under the scope of the present disclosure.

Although the invention has been shown and described with reference to the preferred embodiments, the scope of the present disclosure is not limited thereto, and numerous other modifications and embodiments can be devised by those skilled in the art that will fall within the spirit and scope of the principles of the invention described in the appended claims.

DESCRIPTION OF REFERENCE NUMERALS

100: battery module
200: cell block
51: terminal busbar
112: battery cell
110: battery cell stack
300: end plate
120: module frame

The invention claimed is:

1. A battery module comprising:
   two or more cell blocks, each cell block including a battery cell assembly containing one or more battery cells and a pair of terminal busbars connected to the battery cell assembly to electrically connect the battery cell to an external device; and
   a module frame for housing the two or more cell blocks, the module frame defining an enclosed case with an opening to receive the two or more cell blocks, the opening configured to be covered by a flat end plate, the end plate including four or more openings for exposing the terminal busbars extending therethrough,
   wherein the two or more cell blocks are not electrically connected to each other within the module frame.

2. The battery module of claim 1, wherein the pair of terminal busbars comprises one positive electrode terminal busbar and one negative electrode terminal busbar.

3. The battery module of claim 1, wherein the pair of terminal busbars extend through the module frame such that the terminal busbars are exposed outside of the module frame.

4. The battery module of claim 1, wherein each of the cell blocks comprise a protective film covering a side surface of the battery cell assembly.

5. The battery module of claim 1, wherein the battery module further comprises a busbar frame that covers an upper part of the battery cell assembly and a side surface of the battery cell assembly, the terminal busbar being fixed to the busbar frame, the busbar frame extending across two or more cell blocks.

6. The battery module of claim 5, wherein four or more terminal busbars contained in the two or more cell blocks are fixed to the busbar frame.

7. A battery pack comprising:
   at least one battery module according to claim 1, and
   a pack case for packaging the at least one battery module.

8. A device comprising at least one battery pack according to claim 7.

\* \* \* \* \*